United States Patent [19]

Mita

[11] Patent Number: 4,917,262
[45] Date of Patent: Apr. 17, 1990

[54] COOKING VESSEL WITH ADJUSTABLE VENT SPACES

[75] Inventor: Masamichi Mita, Ashikaga, Japan

[73] Assignee: Mita Alumi Ind. Co., Ltd., Tochigi, Japan

[21] Appl. No.: 291,783

[22] Filed: Dec. 29, 1988

[30] Foreign Application Priority Data

Nov. 8, 1988 [JP] Japan ................................ 63-144991

[51] Int. Cl.$^4$ ............................................ B65D 51/00
[52] U.S. Cl. ..................................... 220/366; 220/360
[58] Field of Search ................. 220/366, 360, 356, 83

[56] References Cited

U.S. PATENT DOCUMENTS

| | | | |
|---|---|---|---|
| 2,241,064 | 5/1941 | Harbison | 220/360 |
| 2,845,059 | 7/1958 | Kelleher | 220/366 X |
| 2,867,352 | 1/1959 | Kawano | 220/366 |
| 3,797,694 | 3/1974 | See et al. | 220/366 X |
| 4,670,398 | 6/1987 | Song | 220/366 X |
| 4,736,867 | 4/1988 | Feimer et al. | 220/366 X |

*Primary Examiner*—Steven M. Pollard
*Attorney, Agent, or Firm*—Wenderoth, Lind & Ponack

[57] ABSTRACT

A cooking vessel having mutually matched stepped parts formed in the opposed edges of a lid and a pot in such a manner that the lid, when placed to close an open end of the pot, is rotated about the center thereof, the stepped parts of the pot proper and the lid define spaces. These spaces are fit for many purposes.

6 Claims, 4 Drawing Sheets

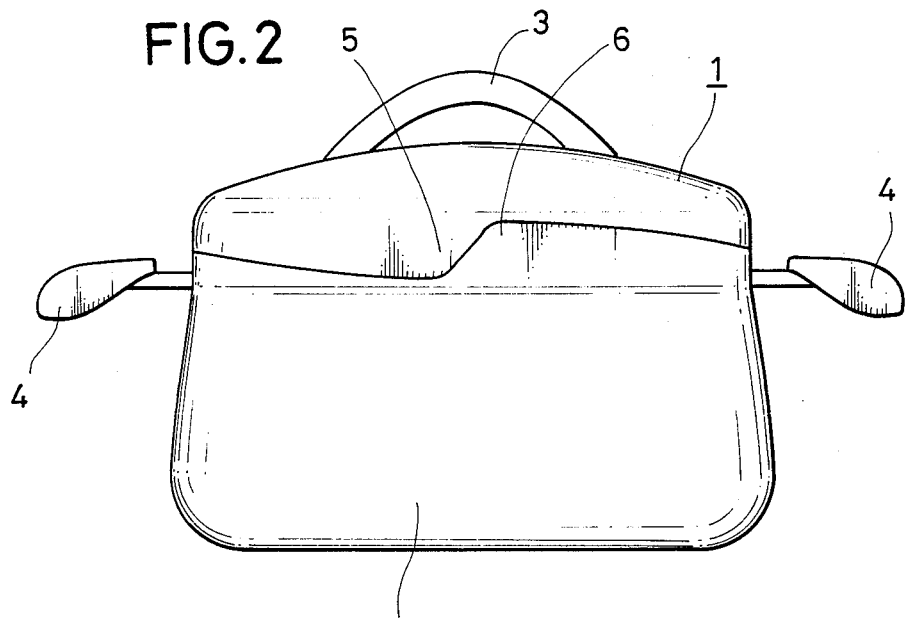
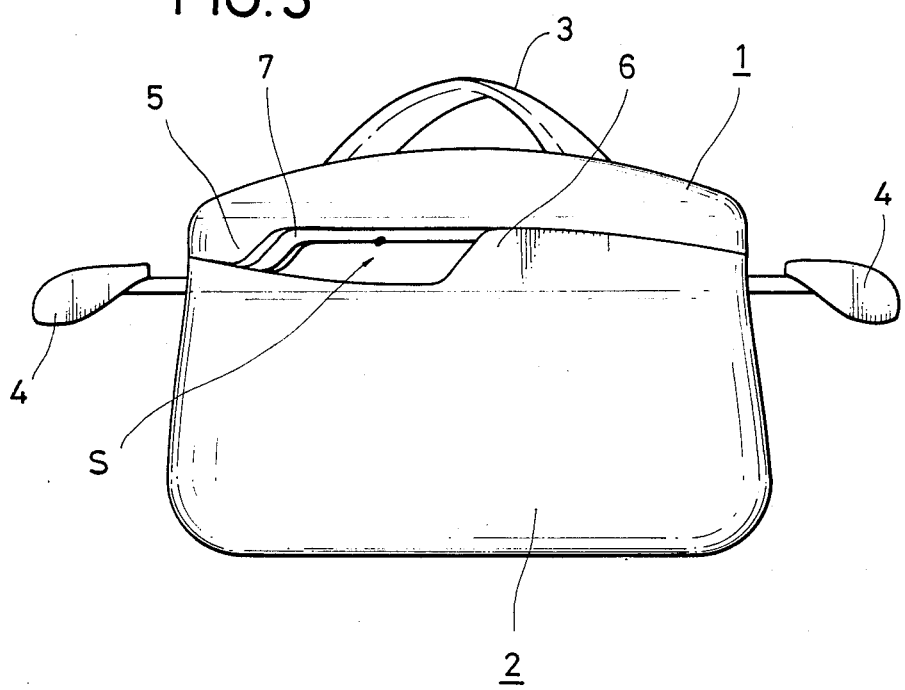

COOKING VESSEL WITH ADJUSTABLE VENT SPACES

FIELD OF THE INVENTION AND RELATED ART STATEMENT

This invention relates to improvements in various pots for household and business use.

The vessels or pots in popular use to date are widely varied in shape. In spite of the variety, they are generally composed of a lid and a pot proper. The lid is utilized exclusively as a means for closing and opening the open end of the pot proper.

Of these pots, those which are required to release into the ambient air steam emanating from food being cooked therein generally have their lids provided at a proper place with a steam vent of required size.

The steam vents formed in the lids of the conventional pots have their sizes fixed at the time the pots are manufactured. Because of this construction, these pots are incapable of suitably adjusting the amount of the steam to be released for the cooking in process, which is prone to infinite variation. Where they are required to release a large volume of steam during cooking, users have no alternative but to remove the lids from the pots proper and leave the open ends of the pots proper agape.

Generally, while foodstuffs are boiled and steamed in pots or transferred from the pots to plates or bowls, the users handle cooking utensils such as dippers and turners. When these cooking utensils are left standing in the pots proper, their handles inevitably sticking out of the pots proper prevent the lids from being properly replaced to close the open ends of the pots and, as the result, possibly keep the pots from being used properly for continued cooking or compel the hot cooked foodstuffs in the pots to cool off quickly.

OBJECT AND SUMMARY OF THE INVENTION

This invention is directed primarily to providing a novel cooking vessel which is free from the various drawbacks suffered by the conventional pots as described above.

To accomplish the object mentioned above in a vessel composed of a lid and a pot, this invention contemplates a construction having mutually matched stepped parts formed at least one each in the opposed edges of the lid and the pot in such a manner that when the lid positioned to close the open end of the pot proper is rotated about its center, the stepped part in the lid and the stepped part in the pot proper are separated from each other and define a desired aperture.

Further, this invention contemplates, based on the construction described above, a construction having two mutually matched stepped parts formed symmetrically at two portions in the opposed edges of the lid and the pot, and a construction having the mutually matched stepped parts in the lid and the pot formed in a curved shape. The lid and the pot may also have gradual curves capable of effectively absorbing the contours of the stepped parts mentioned above, and in tight mutual contact, formed in the opposed edges of the lid and the pot other than the stepped parts.

The objects and characteristics of the present invention will become more apparent from the description given hereinafter with reference to the accompanying drawings.

BRIEF DESCRIPTION OF THE DRAWINGS

FIG. 2 is a front view of the embodiment of FIG. 1;

FIG. 3 is a front view of the embodiment of FIG. 1;

DESCRIPTION OF THE PREFERRED EMBODIMENT

Figure 1:
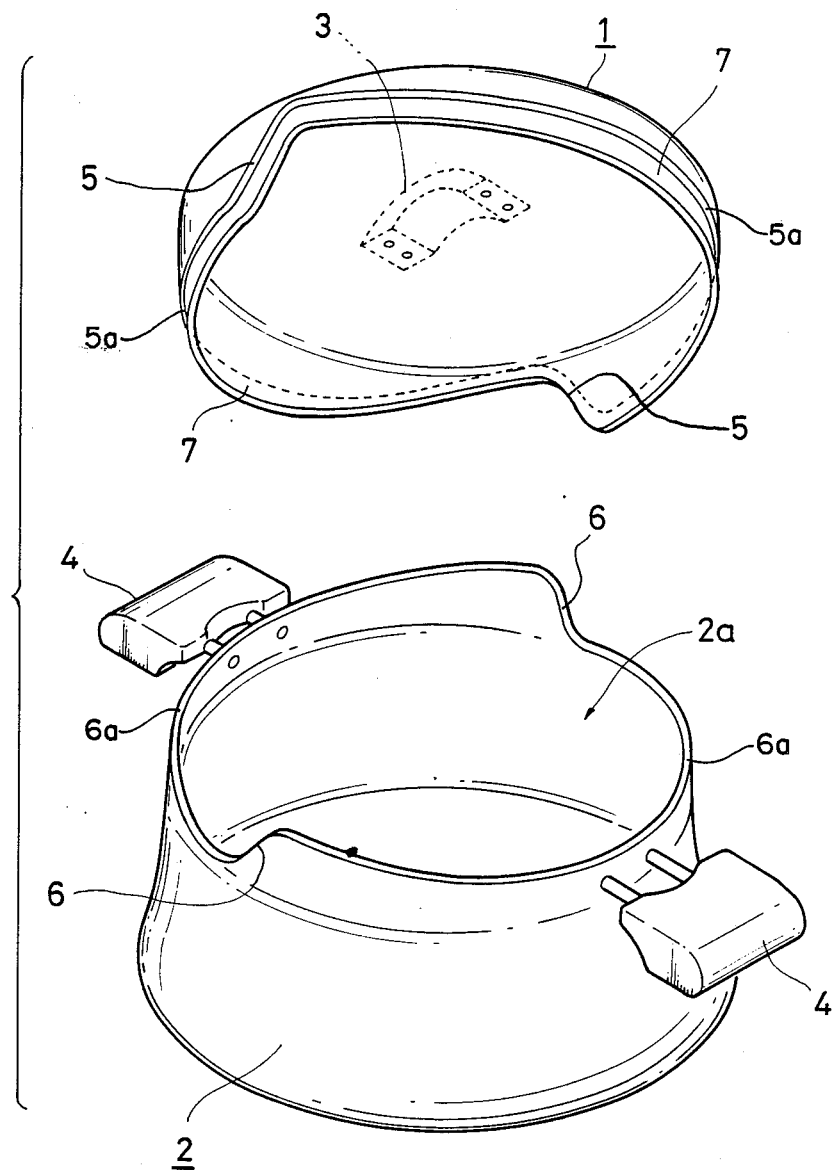
FIG. 1 is an exploded perspective view of a first embodiment of this invention.

The present invention will be described in detail below with reference to the illustrated embodiments.

A cooking vessel embodying this invention, like any of the pots known in the art, comprises a lid 1 provided with a knob 3 and a pot 2 provided with a pair of handles 4. It is characterized by having two pairs of mutually matched curved stepped parts 5, 6 formed symmetrically at two positions in the opposed edges of the lid 1 and the pot 2. Gradually curved mating guide parts 5a, 6a, capable of effectively absorbing the contours of the stepped parts 5, 6 mentioned above are formed in the portions of the opposed edges of the lid 1 and the pot 2 other than the stepped parts 5, 6 to extend between the stepped parts.

Further, from the edge of the lid 1, a guide wall 7 adapted to contact the inner wall of the edge of the pot proper 2 extends down along the continuous curved shape of the edge mentioned above.

In the construction described above, when the lid 1 is placed on an open end 2a of the pot 2 as guided by the aforementioned guide wall 7 in such a manner that the stepped parts 5 on the lid 1 and the stepped parts 6 on the pot 2 come into mutual engagement, the lid 1 can close the open end 2a of the pot proper 2 perfectly in a tight state as illustrated in FIG. 2. When the lid 1, keeping the open end 2a closed is rotated by means of the knob 3 in a stated direction, the engagement between the stepped parts 5 on the lid 1 and the stepped parts 6 on the pot 2 is easily broken to give rise to two spaces S between the respective stepped parts 5, 6.

While the pot of this embodiment is in use, therefore, the spaces S formed by the rotation of the lid 1 can be utilized as steam vents. Unlike conventional vessels, therefore, the pot of this invention is not required to have a steam vent formed in the lid 1. Since the size of such steam vents can be promptly fixed by suitable selecting the amount of rotation imparted to the lid 1, the amount of steam to be released can be easily adjusted.

Moreover in the present embodiment, when the lid 1 is not required to form a steam vent, the food held in the pot is perfectly isolated from the ambient air. In cooking which does not require any release of steam from the vessel, therefore, the vessel permits the time required for boiling to be effectively reduced and exhibits a notably high ability to keep the heated food from cooling.

When the stepped parts 5, 6 are allowed to define large spaces S, the heated food held in the pot 2 is efficiently cooled with the lid 1 kept covering the pot 2. Unlike the conventional pots which, for the purpose of quickly cooling the hot contents thereof, require the lid to be removed from the pot and placed somewhere with a sacrifice of tidiness of kitchen, the vessel of this invention is not only free from the inconvenience experienced when the lid 1 is completely removed from the pot, but is also highly satisfactory from a hygienic point of view.

Figure 4:
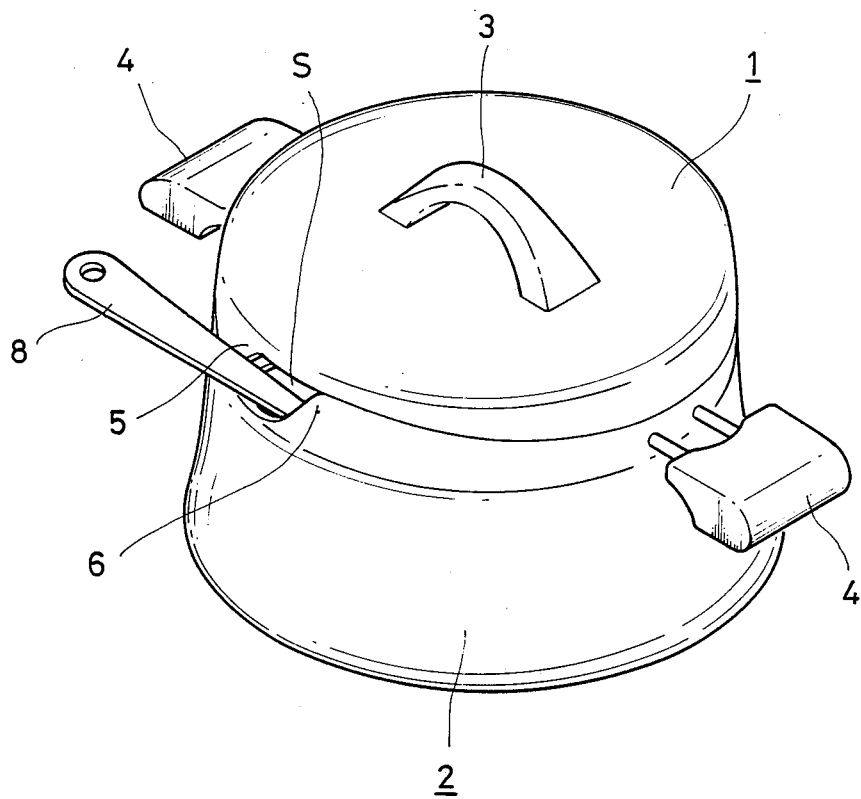
FIG. 4 is a perspective view having the handle of a cooking utensil thrust through an aperture defined in the vessel.

The freedom enjoyed in the formation of the spaces S between the stepped portions 5, 6 ensures the convenience of use mentioned above. The spaces S enable the handle 8 of a cooking utensil such as a dipper or a turner (not shown) to be thrust out of the pot as illustrated in FIG. 4. Even if the cooking utensil is left resting on the side of pot 2, the possibility of the lid 1 being unsightly tilted by the handle 8 of the cooking utensil sticking out of the vessel is perfectly nil. The pot of this invention, therefore, is highly convenient from the standpoint of boiling food and keeping hot food from cooling.

A space large enough for easy inspection of the interior of the pot 2 can be easily formed not by lifting the lid 1 but by rotating the lid 1, a suitable amount. The spaces S defined by the stepped parts 5 on the lid 1 and the stepped parts on the pot 2, therefore, can be utilized as inspection windows. The user is thus allowed to confirm the condition of the food either visually or with the aid of a cooking utensil without taking the trouble of removing the lid 1, and may add seasonings freely to the pot interior from time to time. When the entire vessel is tilted, the spaces S defined by the stepped parts 5, 6 can each be used as a drain.

The present embodiment, originating in the attention attracted by the lid 1 which has been heretofore utilized exclusively as a means for opening and closing the open end 2a of the pot 2, is characterized by the fact that the opposed edges of the lid 1 and the pot 2 are allowed to define the multi-purpose spaces S when the lid 1, held in a state keeping the open end 2a of the pot 2 closed, is rotated about its center. The pot enjoys very high economic utility in spite of its simple construction.

Figure 5:
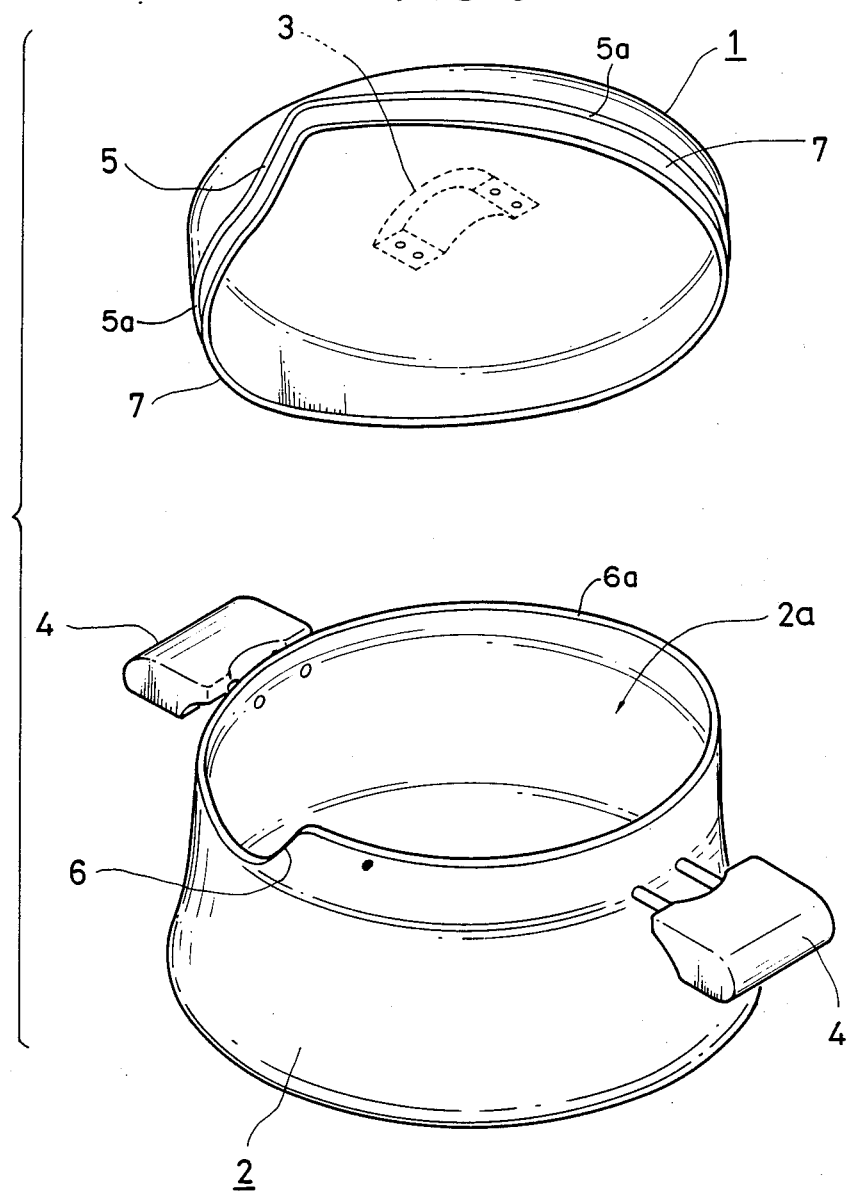
FIG. 5 is an exploded perspective view of another embodiment of this invention.

The embodiment has been described as having two stepped parts 5,6 formed symmetrically in the opposed edges of the lid 1 and the pot 2. This invention is not required to be limited to this particular construction. This invention attains its object in the minimal measure by having at least one mutually matched curved stepped part 5, 6 formed in the opposed edges of the lid 1 and the pot 2, as illustrated in FIG. 5. For the sake of design and function, it is permissible to have two such stepped parts 5, 6 formed in the opposed edges. Even in this case, very gradually curved guide parts 5a, 6a, capable of effectively absorbing the curved shapes of the stepped parts 5, 6, and coming into tight mutual contact, may be formed in the portions of the opposed edges of the lid 1 and the pot 2 other than the stepped parts 5, 6.

The embodiments have been described as having the opposed edges of the lid 1 and the pot 2 formed as continuous lines inclusive of the stepped parts 5, 6, i.e. as having transition curves at the intersections of the stepped parts and guide parts. In this respect, the present invention is not limited to the embodiments cited above. It is permissible to have the stepped parts 5, 6 formed by mutually matched rectangular shapes and the guide parts 5a, 6a formed in rectilinear shapes.

This invention is directed to a vessel which is characterized by having at least one set of mutually matched stepped parts formed in the opposed edges of the lid and the pot so that desired spaces are defined by the stepped parts when the lid, placed to close the open end of the pot, is rotated about its center. The spaces which are thus produced by the rotation of the lid can be used as steam vents. Unlike conventional pots, this vessel is not required to provide a steam vent in the lid. Since the size of these spaces can be adjusted as required by suitably selecting the amount of rotation of the lid, the amount of steam to be released from the pot can be readily adjusted.

Further, in this invention, the food held inside the pot is completely isolated from the ambient air when the lid is placed tightly on the open end of the pot. Owing to this function, the pot can reduce the time required for boiling food and keep the heated food from cooling quickly. When the spaces defined by the stepped parts are large, the heated food can be cooled efficiently with the lid kept in place on the pot.

The spaces also permit the handle of a cooking utensil dipped in the food to thrust out of the vessel. When this cooking utensil is left standing inside the vessel, the handle thrust out of either of the spaces has absolutely no possibility of raising the lid. Further, the spaces defined by the stepped parts of the lid and those of the pot are usable as inspection windows. The vessel therefore, permits the user to confirm the condition of the food readily, and add seasonings to the contents of the pot through the spaces from time to time without taking the trouble of lifting the lid from the pot.

When the pot is tilted while kept covered with the lid, the spaces defined by the stepped parts are each used as a drain. The pot of this invention possesses numerous heretofore unattainable economic advantages.

What is claimed is:

1. A cooking vessel, comprising in combination:
a pot having a generally concave shape defining an interior and a substantially circular opening, said opening having an upper edge, said upper edge having at least one circumferential portion forming a first stepped part having an upper end and a lower end, and at least one circumferential portion forming a first guide part extending in a circumferential direction from said lower end to said upper end of said first stepped part; and
a lid adapted to close said opening, said lid having a lower edge adapted to mate with said upper edge of said pot, said lower edge having at least one circumferential portion forming a second stepped part having an upper end and a lower end, and at least one circumferential portion forming a second guide part extending in said circumferential direction from said lower end to said upper end of said second stepped part;
whereby said lid rests upon said pot with said edges in substantially abutting relation to substantially close said opening of said pot, and upon rotation of said lid in said circumferential direction said lid rests upon said pot with portions of said first and second guide parts in substantially abutting relation and said first and second stepped parts and remaining portions of said first and second guide parts in spaced opposed relation to thereby define at least one space providing unrestricted access to said interior, the area of said space being a function of the angle of rotation of said lid.

2. A vessel as in claim 1, wherein said upper edge further comprises smooth transition curves at the intersections of said first stepped part and said first guide part, and said lower edge further comprises smooth transition curves at the intersections of said second stepped part and said second guide part.

3. A vessel as in claim 2, wherein said lid further comprises a guide wall, said guide wall being radially inward of, and extending downwardly from, said lower edge of said lid.

4. A vessel as in claim 1, wherein said upper edge and said lower edge each have two of said stepped parts and two of said guide parts, said guide parts being equally circumferentially spaced on the associated edge with said guide parts extending therebetween.

5. A vessel as in claim 4, wherein said upper edge further comprises smooth transition curves at the intersections of said first stepped parts and said first guide parts, and said lower edge further comprises smooth transition curves at the intersections of said second stepped parts and said second guide parts.

6. A vessel as in claim 5, wherein said lid further comprises a guide wall, said guide wall being radially inward of, and extending downwardly from, said lower edge of said lid.

* * * * *